(12) United States Patent
Love et al.

(10) Patent No.: US 8,277,562 B2
(45) Date of Patent: Oct. 2, 2012

(54) CONTINUOUS VACUUM PAN AND INTERNAL INSULATION ARRANGEMENT THEREOF

(75) Inventors: David John Love, Durban North (ZA); Leon Smith, Amanzimtoti (ZA); Paul Martin Schorn, Sunningdale (ZA); Stephen David Peacock, Athlone Park (ZA); Warren David, Umhlanga (ZA)

(73) Assignee: Tongaat Hulett Limited, Tongaat (ZA)

( * ) Notice: Subject to any disclaimer, the term of this patent is extended or adjusted under 35 U.S.C. 154(b) by 0 days.

(21) Appl. No.: 13/050,783

(22) Filed: Mar. 17, 2011

(65) Prior Publication Data

US 2011/0220100 A1   Sep. 15, 2011

Related U.S. Application Data

(63) Continuation of application No. PCT/IB2009/053844, filed on Sep. 3, 2009.

(30) Foreign Application Priority Data

Sep. 18, 2008 (ZA) ........................................ 08/8121

(51) Int. Cl.
*C13B 30/00* (2011.01)
(52) U.S. Cl. ............ 127/2; 127/15; 159/27.1; 159/27.5; 159/28.2

(58) Field of Classification Search .............. 127/15–18, 127/58, 61, 1, 2; 23/295 R; 422/245, 245.1; 159/26.1, 27.1, 27.5, 28.2; 202/205
See application file for complete search history.

(56) References Cited

U.S. PATENT DOCUMENTS

| | | | | |
|---|---|---|---|---|
| 3,096,630 A * | 7/1963 | Weller | ............................. | 62/506 |
| 3,165,435 A * | 1/1965 | Henszey | ....................... | 159/47.1 |
| 3,424,221 A * | 1/1969 | Luce | ............................. | 159/47.1 |
| 3,879,215 A * | 4/1975 | De Villiers et al. | .............. | 127/16 |
| 3,880,593 A * | 4/1975 | Windal | ........................... | 422/253 |
| 6,991,708 B2 * | 1/2006 | Schorn et al. | .................. | 202/205 |
| 7,972,445 B2 * | 7/2011 | Singh et al. | ....................... | 127/16 |

* cited by examiner

*Primary Examiner* — Joseph Drodge
(74) *Attorney, Agent, or Firm* — Kilpatrick Townsend & Stockton LLP

(57) ABSTRACT

This invention relates to a continuous vacuum pan (also sometimes referred to as an evaporative crystallizer) for use in the sugar processing industry, and to a heat exchanger used inside the continuous vacuum pan. The invention also relaters to the heat exchanger as used in other applications in the sugar processing industry. The heat exchanger includes a massecuite flow path for conveying massecuite therethrough, and a heat transfer medium flow path for receiving a heat transfer medium to enable heat transfer to the massecuite flow path. The heat exchanger is characterized therein that a periphery thereof is surrounded by an insulated zone in order to prevent heat transfer from the heat transfer medium flow path to the environment.

9 Claims, 1 Drawing Sheet

CONTINUOUS VACUUM PAN AND INTERNAL INSULATION ARRANGEMENT THEREOF

CROSS-REFERENCES TO RELATED APPLICATIONS

This application is a continuation of PCT/IB2009/053844, filed Sep. 3, 2009, which claims the benefit of South African Application No. 2008/08121, filed on Sep. 18, 2008, the full disclosures of which are incorporated herein by reference.

BACKGROUND OF THE INVENTION

This invention relates to a continuous vacuum pan (also sometimes referred to as an evaporative crystallizer) for use in the sugar processing industry, and to an insulation arrangement used inside the continuous vacuum pan. More particularly, but not exclusively, the invention relates to an insulating arrangement between a calandria and a down-take of the continuous vacuum pan.

In this specification the term "calandria" shall be interpreted to mean a shell and tube reboiler commonly used in continuous pans found in the sugar processing industry. The calandria may generally be of a floating or a fixed configuration, as is known in the art.

During one particular stage of the sugar production process, syrup produced by evaporators is concentrated further in specially designed vessels known as pans. As the concentration rises the dissolved sugar crystallises and the work of the pans is to grow sugar crystals (from the sucrose in syrup) in several steps to maximise the amount of sucrose recovered in raw sugar. It will be appreciated that this is a crucial step in the sugar production process, and hence much attention has been given to the design of pans, and in particular continuous vacuum pans, in recent times.

A vacuum pan is essentially a vessel, operated under vacuum, in which sugar syrup is boiled in order to increase the sugar concentration, and thus resulting in the formation of sugar crystals, resulting in a suspension of crystals within the mother liquor from which they are growing (so-called massecuite). A calandria is generally used as a reboiler to heat the massecuite and also to cause circulation of massecuite inside the vessel. Steam is supplied to the calandria via a steam inlet, and is conveyed between the tubes of the calandria, condensing on the tube walls, thus resulting in effective heat transfer from the calandria to the massecuite. One particular continuous vacuum pan design is disclosed in the applicant's own prior patent, U.S. Pat. No. 6,991,708, the contents of which is incorporated herein by reference.

A critically important aspect of vacuum pan design is ensuring that there is good circulation of massecuite within the pan. The desired circulation path starts with massecuite flow upwards through the tubes of the calandria (that are heated on their outsides) and then on exiting the tubes, flows over the tops of the tubes towards the down-take where it flows downwards through the down-take before re-entering the tubes at their base. Whilst mechanical stirrers installed in the down-take can be used to improve circulation (stirred pans) it is preferable to ensure that the boiling process itself produces good circulation (natural circulation pans).

It was once believed that the driving force for circulation was the density difference between hot massecuite in the tubes and colder massecuite within the down-take. It has since been shown that the lower average density of boiling massecuite, i.e. a combination of massecuite and vapour bubbles, provides the circulating driving force when compared with the massecuite (without vapour bubbles) in the down-take.

Good circulation results when there is a good driving force and a low resistance to flow. One major decision in achieving this is the selection of tube diameter to improve the driving force whilst minimising the frictional drag. A tube diameter of approximately 100 mm is often chosen as the best compromise in this regard. The other major factor is the relative size and location of the down-take. The "circulation ratio" of a pan is a parameter often used to characterise this aspect of pan design. The "circulation ratio" is the ratio of the total cross-sectional area of all the tubes to the cross-sectional area of the down-take and a value of 2.5 is considered to be appropriate for circular batch pans with a centrally located cylindrical down-take. Larger circulation ratios imply a relatively small down-take and are known to result in poorer circulation.

Whilst the circulation ratio is effective in selecting the appropriate size of a single cylindrical down-take, it has been shown that it is not applicable in the same way for other designs of down-takes. A specific example is in "floating calandria" pans where the shape of the down-take is an annulus adjacent the pan wall. A number of poorly performing pans of this design have been subsequently modified to have conventional calandrias with central cylindrical down-takes. It is recognised that an annular down-take will have a proportionally greater wall area, and thus more drag, than a cylindrical down-take of the same cross-sectional area and that this can to some degree explain the poor performance of floating calandria pans. The extra drag of a non circular down-take can to some extent be taken into account by using the concept of a hydraulic diameter" (defined as 4* the cross-sectional area divided by the wetted perimeter). The applicant's continuous pan design, as taught in U.S. Pat. No. 6,991,708, has a non-circular down-take adjacent the outside wall of the pan and is thus somewhat similar to a floating calandria. This pan achieves good circulation by using a smaller circulation ratio than appropriate for a conventional batch pan with a central cylindrical down-take.

A factor that does not appear to have been taken into account in pan design is the extra drag that will result from boiling taking place on the wall of the down-take that is shared with the calandria, i.e. where there is heating steam on the opposing side of the wall from the massecuite. This may even result in a portion of the massecuite that is closest to the wall flowing upwards in the down-take. It is likely that this effect will be greatest in pans with non-cylindrical down-takes, such as floating calandria pans or continuous pans with down-takes adjacent to the outside wall.

It is believed that the circulation within a pan will be improved if boiling within the down-take can be prevented by limiting or preventing heat transfer from the steam within the calandria to massecuite in the down-take.

It is therefore an object of the invention to provide a continuous vacuum pan that will, at least partially, overcome the above disadvantages.

It is also an object of the invention to provide a continuous vacuum pan which will be a useful alternative to existing vacuum pans.

It is a still further object of the invention to provide a continuous vacuum pan utilizing a calandria insulation arrangement that will reduce heat transfer between the calandria and massecuite in the down-take.

BRIEF SUMMARY OF THE INVENTION

According to the invention there is provided a vacuum pan including: a vessel for receiving massecuite; a heat exchanger for heating the massecuite located in the vessel; the heat exchanger including a first massecuite flow path for conveying massecuite therethrough, and a heat transfer medium flow path for receiving a heat transfer medium; the vacuum pan characterized therein that a second massecuite flow path is defined in the vessel at least partially adjacent a side of the heat exchanger, and wherein an insulated zone is provided between the heat transfer medium flow path of the heat exchanger and the second flow path, in order to reduce heat transfer between the heat exchanger and the second flow path.

In a preferred embodiment the vacuum pan may be a continuous vacuum pan.

There is provided for the heat exchanger to be in the form of a calandria, and for the heat transfer medium flow path to be a vapour space of the calandria.

The heat transfer medium may be evaporated water vapour.

There is provided for the first massecuite flow path to be an operatively upward flow path, and for the second massecuite flow path to be an operatively downward flow path in order for the flow paths, in series, to form a continuous circulating flow path inside the vessel.

The second massecuite flow path may be a down-take of the continuous vacuum pan.

The insulated zone is preferably in the form of a double wall defining an internal cavity therebetween, and which separates the heat exchanger, and more preferably the heat transfer medium flow path of the heat exchanger, from the second flow path.

The internal cavity is preferably in flow communication with a ventilation conduit.

There is further provided for the internal cavity in use to be at least partially evacuated through the ventilation conduit. Preferably, the internal cavity is evacuated to a pressure where the saturated vapour temperature of vapour in the internal cavity is below the boiling point of massecuite in the second flow path.

The pressure in the internal cavity may be between 5 and 15 kPa(a), preferably about 10 kPa(a).

In one embodiment the calandria may be a floating calandria, and the insulated zone may be provided on an outer perimeter of the calandria. In an alternative embodiment the calandria may be a fixed calandria, and the insulated zone may be provided on an inner annular perimeter of the calandria.

There is still further provided for the internal cavity to be in flow communication with a vapour space of the continuous vacuum pan.

There is also provided for the internal cavity to be in flow communication with a vapour space inside the calandria, which flow communication may be achieved by providing apertures in an outer wall of the calandria, and thus an inner wall of the insulated zone.

The continuous vacuum pan may be a stirred pan or an unstirred pan.

According to a further aspect of the invention there is provided a heat exchanger including a massecuite flow path for conveying massecuite therethrough, and a heat transfer medium flow path for receiving a heat transfer medium to enable heat transfer to the massecuite flow path, the heat exchanger characterized therein that a periphery thereof is surrounded by an insulated zone in order to prevent heat transfer from the heat transfer medium flow path to the environment.

There is provided for the heat transfer medium to be used in a continuous vacuum pan, a batch vacuum pan, or an evaporator.

BRIEF DESCRIPTION OF THE DRAWINGS

A preferred embodiment of the invention is described by way of a non-limiting example, and with reference to the accompanying figures in which.

DETAILED DESCRIPTION OF THE INVENTION

Figure 1:
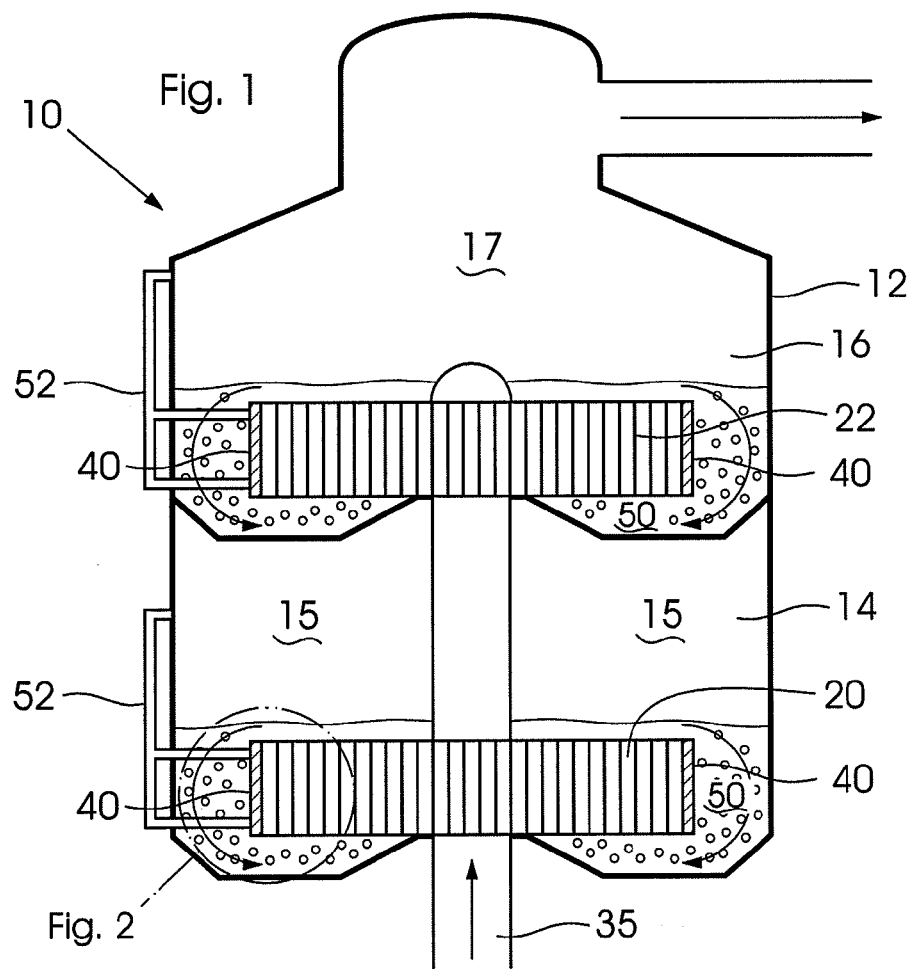
FIG. 1 is a cross-sectional side view of a vacuum pan in accordance with one embodiment of the invention.

Referring to the drawings, in which like numerals indicate like features, a non-limiting example of a continuous vacuum pan in accordance with the invention is generally indicated by reference numeral 10.

The vacuum pan 10 comprises a vessel 12 which, in this particular example, is divided into a first chamber 14, being an operatively lower chamber, and a second chamber 16, being an operatively upper chamber disposed immediately above the first chamber 14. A first heat exchanger or calandria 20 is located in the first chamber 14, and a second heat exchanger or calandria 22 is located in the second chamber 16. It will be appreciated that the invention may find application in many different vacuum pan configurations, and the double chamber vacuum pan design described herein is but one example. Likewise, the example discloses the use of floating calandrias, but the invention can also be applied to fixed calandrias. Furthermore, the vacuum pan may be a continuous vacuum pan or a batch vacuum pan, and may be stirred or unstirred.

Massecuite 50 is contained in both the first 14 and the second 16 chambers, and the calandrias are supplied with a heat transfer medium, such as for example steam 35, that causes the transfer of heat to tubes 32 of the calandria, as is described in more detail hereinbelow.

Figure 2:
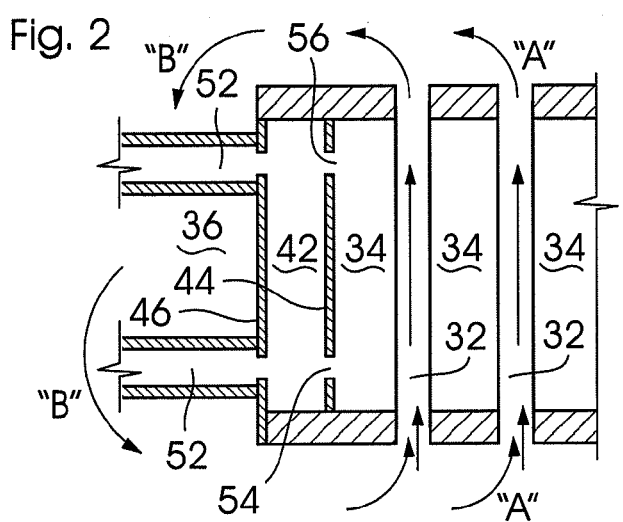
FIG. 2 is an enlarged view of an insulating zone in accordance with the invention, which also shows the interface between the vapour space of the calandria, the insulating zone, and the down-take.

Referring now to FIG. 2, a heat exchanger or calandria (20 or 22) comprises a shell and tube type heat transfer arrangement that consists of a plurality of tubes 32 that extend through a heat transfer medium flow path, or vapour space 34, of the calandria. In use the tubes 32 convey massecuite, whereas the calandria vapour space 34 contains a heat transfer medium, such as steam, which is provided via a heat transfer medium supply 35. Heat is therefore transferred from the vapour space 34 to the tubes 32, and more particularly to the massecuite conveyed inside the tubes 32. As the massecuite in the tubes 32 heats up boiling is induced, and this causes the average density of the massecuite in the tubes 32 to reduce due to the presence of vapour bubbles. This consequently results in upward movement of the massecuite, and the massecuite exits the calandria through upper ends of the tubes 32. The movement of massecuite through the calandria is depicted by Arrows A.

Once the massecuite exits the calandria, it is conveyed via the second massecuite flow path 36, known as the down-take, towards the bottom of the vacuum pan, as is indicated by Arrows B. The net effect is that a circulating flow of massecuite is induced without mechanical intervention.

A peripheral region of the calandria (20 or 22) includes an insulated zone 40, in this particular example in the form of a double wall or jacket located about the perimeter of the calandria. It will be appreciated that the peripheral region will be the outer perimeter of the calandria if the calandria is a floating calandria, but an inner annular perimeter of the calandria if the calandria is a fixed calandria. The purpose of the insulated zone or jacket 40 is to thermally isolate the vapour space 34 of the calandria from the second massecuite flow path or down-take 36, so as to prevent heat transfer from the heat transfer medium in the vapour space 34 of the calandria to the massecuite in the down-take 36. If such heat transfer is not prevented, or at least partially reduced, the massecuite that is in contact with the outer wall of the calandria may start to boil, which will adversely affect the downward movement of massecuite in the down-take.

The insulated zone or jacket 40 includes an internal cavity 42 which is a substantially enclosed volume between the outer wall 44 of the calandria and a wall 46 of the insulated zone. The outer wall 44 of the calandria will predominantly be in contact with the heat transfer medium inside the vapour space 34 of the calandria, whereas the wall 46 of the jacket will be in contact with the massecuite in the down-take 36. The massecuite in the down-take 36 and the heat transfer medium in the vapour space 34 are therefore separated by the internal cavity 42. Although it is foreseen that the internal cavity may be filled with an insulating material, a preferred embodiment of the invention, in which the cavity is operated under vacuum, is described in more detail below.

The internal cavity 42 is in flow communication with a vapour space (17 or 15) of the chamber (14 or 16) in which the calandria is located. The vapour spaces are typically operated at pressures of between 5 and 20 kPa (a), and therefore also induces a similar low pressure in the internal cavity 42. An important operational parameter is that the pressure inside the internal cavity 42 must be reduced to a pressure where the saturated vapour temperature is below the boiling temperature of the massecuite, which will therefore prevent vapour inside the cavity 42 from condensing on the wall 46 of the jacket 40, and which will thus prevent or inhibit the occurrence of heat transfer.

An operatively upper aperture 56 and an operatively lower aperture 54 are also provided in the outer wall 44 of the calandria, and serves as vents for light incondensable and heavy incondensable gasses respectively. The internal cavity 42 therefore also serves as a collection chamber for such incondensables, that is in turn vented back in to the vapour spaces (15 or 17) of the pan 10 by way of ventilation conduits 52. The apertures 56 and 54 are sized to accommodate the required venting flow of incondensable gasses, given the pressure differential between the calandria vapour space 34 and the internal cavity 42 of the jacket 40.

The inventors foresee that the invention will improve the circulation of massecuite inside the vacuum pan, whilst simultaneously still providing the functionality of venting incondensables. It is also foreseen that the invention will be implemented very effectively in the applicant's double-calandria vertical continuous pan, as is disclosed in U.S. Pat. No. 6,991,708 (the contents of which is incorporated herein by reference).

It will be appreciated that the above is only one embodiment of the invention, and that there may be many variations without departing from the spirit and/or the scope of the invention.

What is claimed is:

1. A vacuum pan including:
    a vessel for receiving massecuite, the vessel being in flow communication with a low pressure source in order for the vessel in use to be operable under a low pressure;
    a heat exchanger for heating the massecuite located in the vessel;
    the heat exchanger including a first massecuite flow path for conveying massecuite therethrough, and a heat transfer medium flow path for receiving a heat transfer medium;
    wherein the vacuum pan is configured such that a second massecuite flow path is defined in the vessel at least partially adjacent a side of the heat exchanger, and wherein an insulated zone is provided between the heat transfer medium flow path of the heat exchanger and the second flow path, in order to reduce heat transfer between the heat exchanger and the second flow path,
    wherein the insulated zone is in the form of a double wall defining an internal cavity therebetween, and which separates the heat transfer medium flow path of the heat exchanger from the second flow path, and
    wherein the internal cavity is in flow communication with a vapour space of the vacuum pan in which the heat exchanger is located in order for the internal cavity to be evacuated to a pressure similar to the pressure in the vapour space, at which pressure the saturated vapour temperature of vapour in the internal cavity is below the boiling point of massecuite in the second flow path.

2. The vacuum pan of claim 1 in which the internal cavity is in flow communication with a vapour space inside the heat exchanger by way of apertures in an outer wall of the heat exchanger, so as to enable the removal of incondensable gases from the vapour space of the heat exchanger.

3. The vacuum pan of claim 2 wherein the internal cavity is in flow communication with the vapour space of the vacuum pan by way of a ventilation conduit.

4. The vacuum pan of claim 1 in which the heat exchanger is a calandria, and in which the heat transfer medium flow path is a vapour space of the calandria.

5. The vacuum pan of claim 4 wherein the calandria is a floating calandria, and the insulated zone is provided on an outer perimeter of the calandria.

6. The vacuum pan of claim 4 wherein the calandria is a fixed calandria, and the insulated zone is provided on an inner annular perimeter of the calandria.

7. The vacuum pan of claim 1 wherein the first massecuite flow path is an operatively upward flow path, and the second massecuite flow path is an operatively downward flow path in order for the flow paths, in series, to form a continuous circulating flow path inside the vessel.

8. The vacuum pan of claim 7 wherein the second massecuite flow path is a down-take of the continuous vacuum pan.

9. The vacuum pan of any of any one of claims 1 to 8 wherein the heat transfer medium is evaporated water vapour.

* * * * *